United States Patent [19]

Bestmann

[11] Patent Number: 5,425,597
[45] Date of Patent: Jun. 20, 1995

[54] ARRANGEMENT FOR SHORELINE CONSTRUCTION, MAINTENANCE, AND PROTECTION, AND METHODS FOR MAKING AND USING THE SAME

[76] Inventor: Lothar Bestmann, Pinneberger, Strasse 203, D-200Wedel/Holst., Germany

[21] Appl. No.: 225,584

[22] Filed: May 10, 1994

Related U.S. Application Data

[60] Division of Ser. No. 43,272, Apr. 6, 1993, Pat. No. 5,338,131, which is a continuation-in-part of Ser. No. 886,693, May 21, 1992, abandoned.

[30] Foreign Application Priority Data

Mar. 24, 1992 [EP]  European Pat. Off. ............ 92105015

[51] Int. Cl.⁶ .................................................. E02B 3/04
[52] U.S. Cl. .......................................... 405/24; 405/16; 405/19; 405/21
[58] Field of Search .................... 405/15, 16, 21–35; 47/9, 59, 66

[56] References Cited

U.S. PATENT DOCUMENTS

| | | | |
|---|---|---|---|
| 331,127 | 11/1885 | Goodridge | 405/21 |
| 486,887 | 11/1892 | Neale | 405/16 |
| 591,256 | 10/1897 | Hunley et al. | 405/15 |
| 774,901 | 11/1904 | Wright | 405/15 |
| 855,584 | 6/1907 | Neale | 405/16 |
| 864,481 | 8/1907 | Neale | 405/21 X |
| 909,423 | 1/1909 | Kelley | 405/21 X |
| 1,168,547 | 1/1916 | Pedley | 405/15 |
| 2,201,279 | 5/1940 | Willing | 405/15 |
| 4,345,856 | 8/1982 | Tuck | 405/15 |
| 5,035,080 | 7/1991 | Kafka | 47/64 X |

FOREIGN PATENT DOCUMENTS 92105015  11/1992  European Pat. Off. .

OTHER PUBLICATIONS

Translation of Excerpts from DE 3917357A1 by Wendi Goldsmith.

*Primary Examiner*—Dennis L. Taylor
*Attorney, Agent, or Firm*—Richard P. Crowley

[57] ABSTRACT

A plant riprap material for use in a shoreline to prevent erosion, which plant riprap material comprises a felt material, a substrate within the felt material, a plurality of aquatic plants in the substrate, a geotextile material over the top of the felt material and a netting material to retain the plant riprap material in shape.

13 Claims, 8 Drawing Sheets

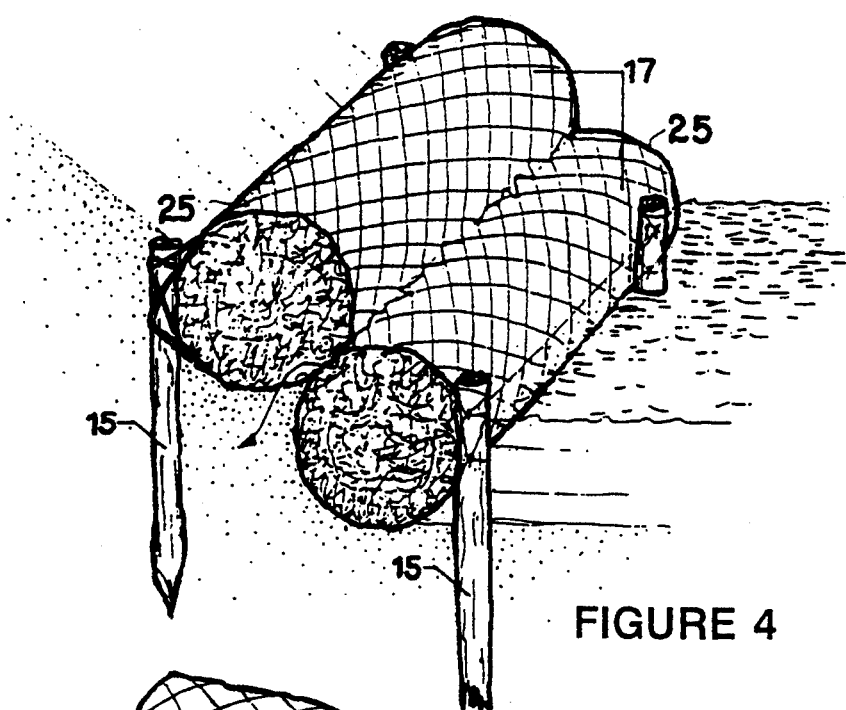
FIGURE 4
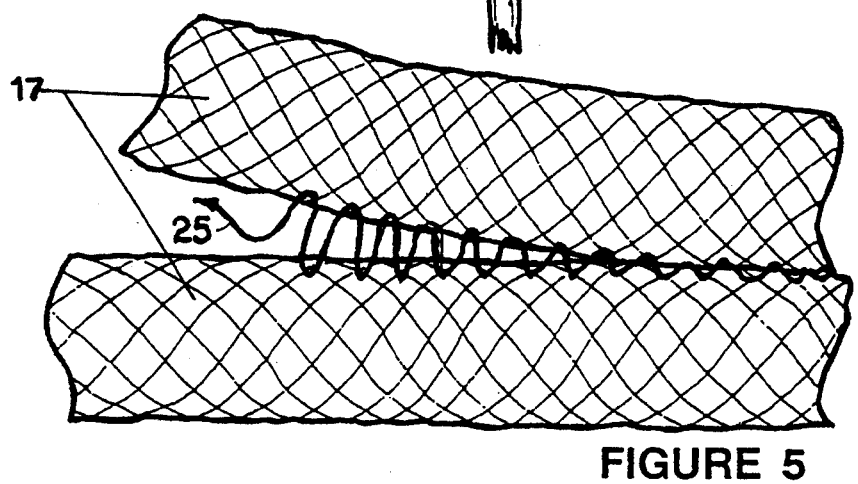
FIGURE 5
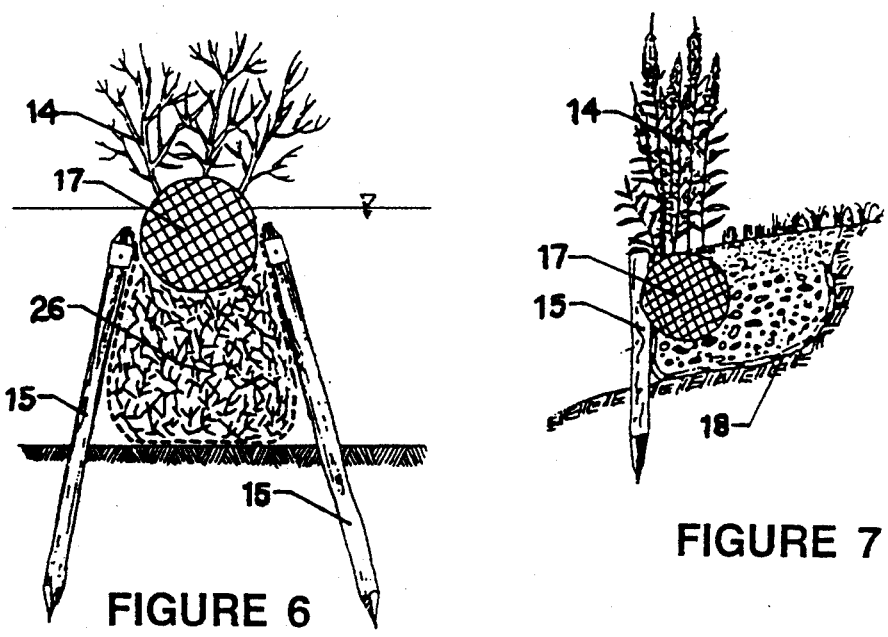
FIGURE 6
FIGURE 7

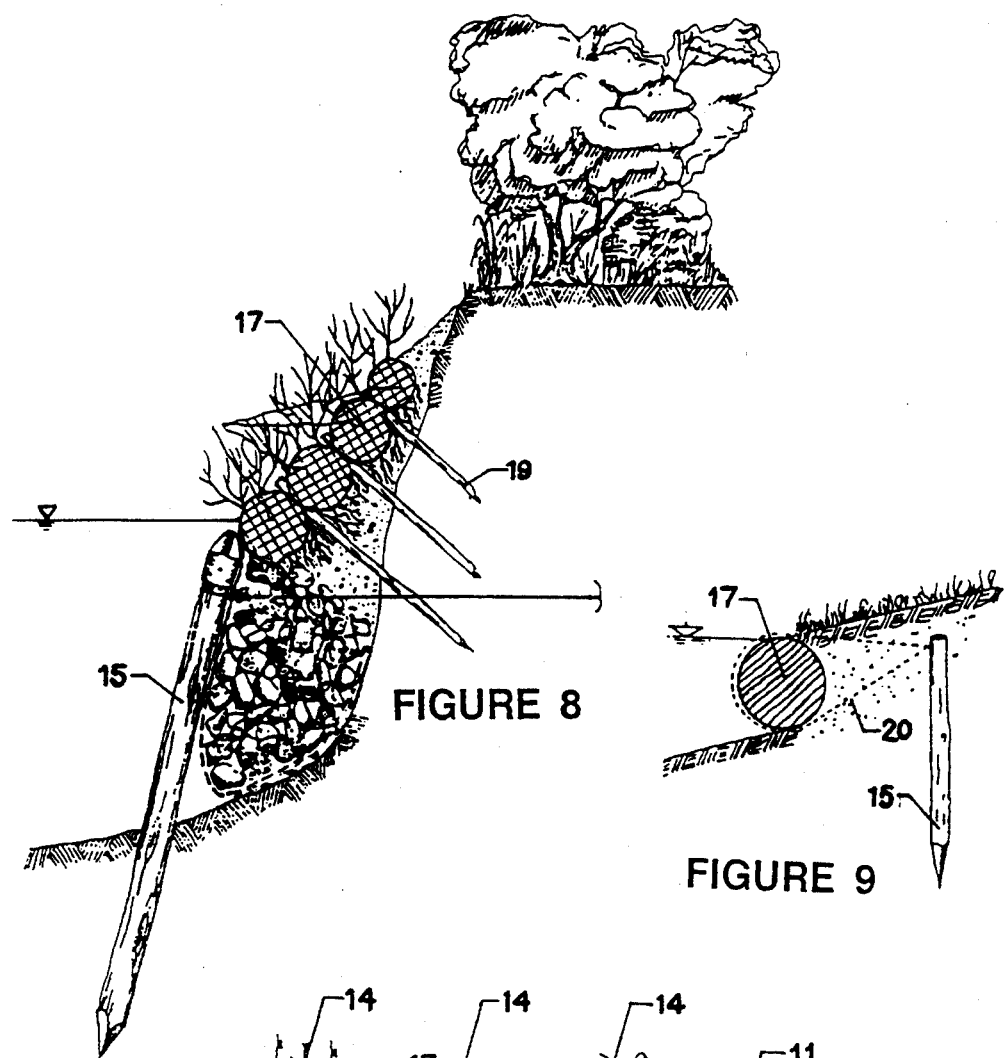
FIGURE 8
FIGURE 9
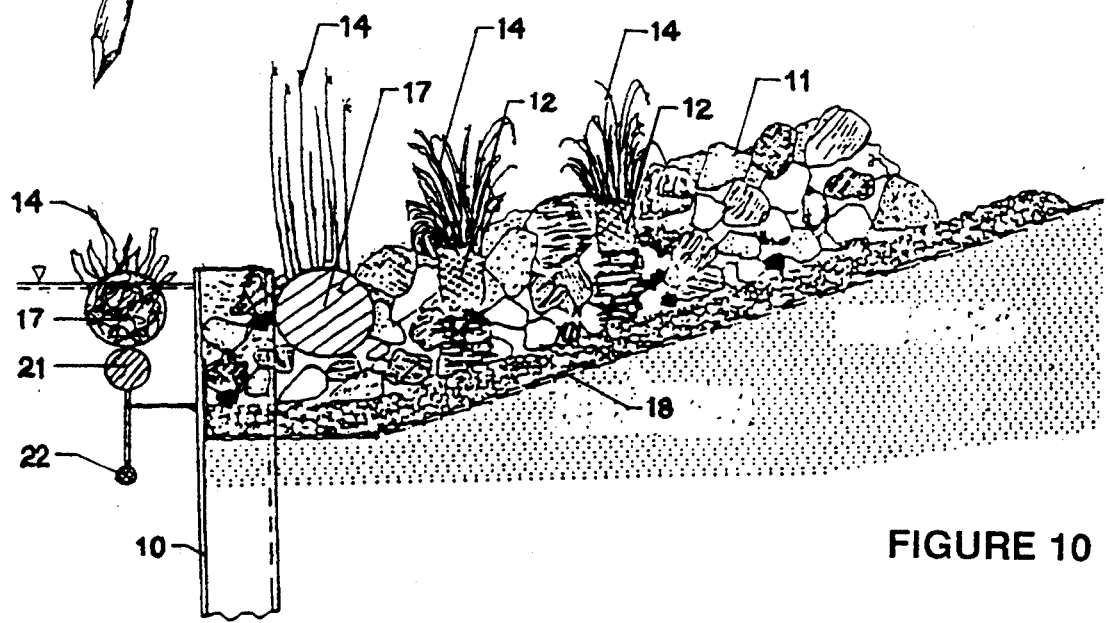
FIGURE 10

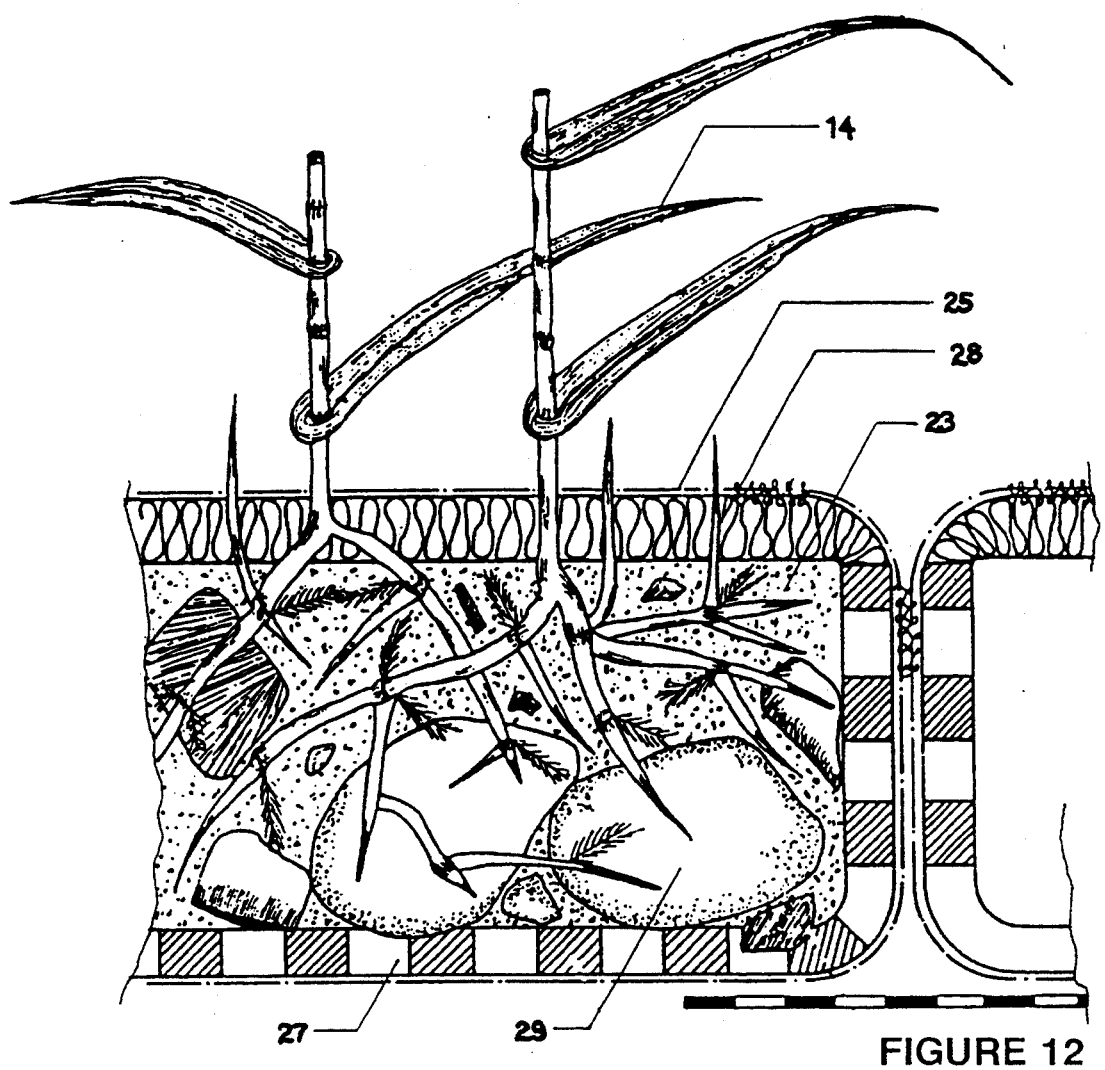
FIGURE 12
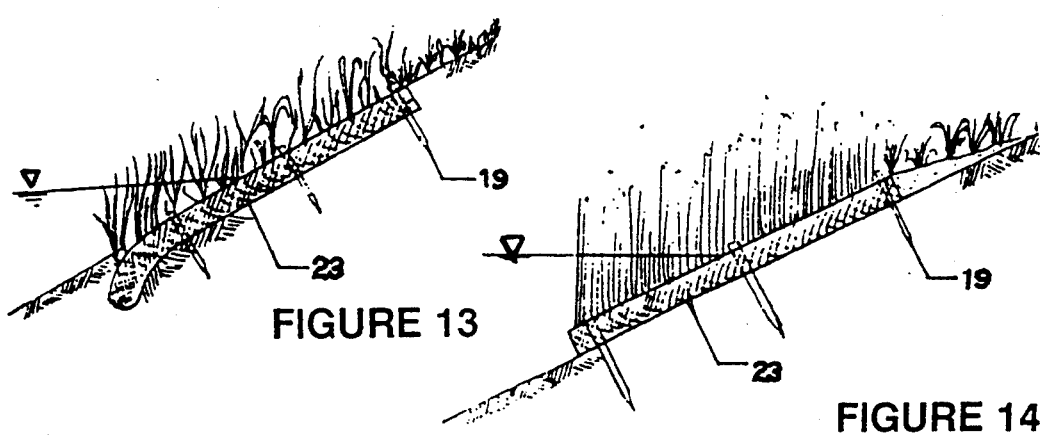
FIGURE 13
FIGURE 14

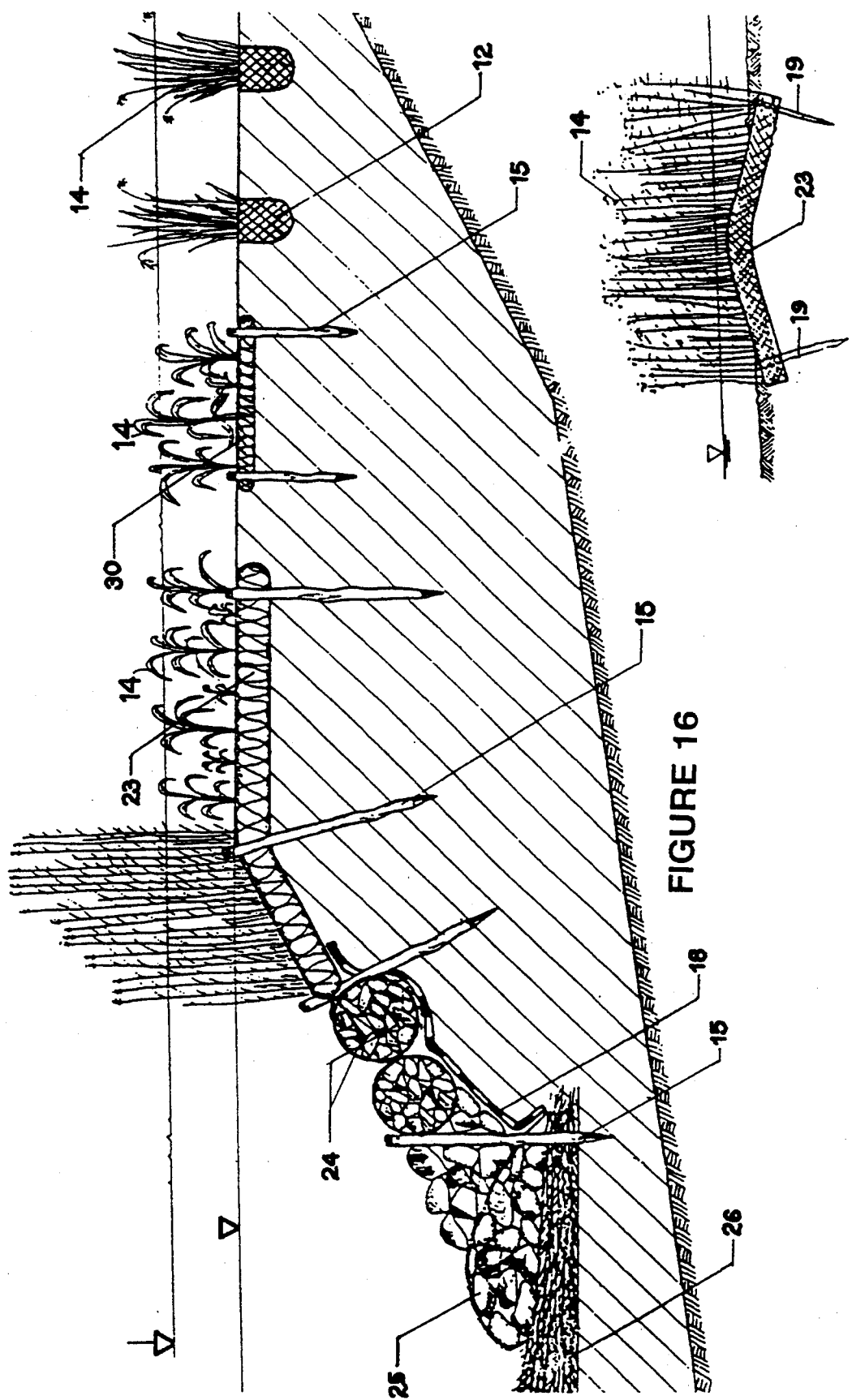

ARRANGEMENT FOR SHORELINE CONSTRUCTION, MAINTENANCE, AND PROTECTION, AND METHODS FOR MAKING AND USING THE SAME

REFERENCE TO PRIOR APPLICATION

This application is a divisional patent application of U.S. patent application Ser. No. 08/043,272, filed Apr. 6, 1993, now U.S. Pat. No. 5,338,131, issued Aug. 16, 1994, which application was a continuation-in-part application of U.S. Ser. No. 07/886,693 filed May 21, 1992, now abandoned, which claimed priority rights based on European Patent Application No. 92105015.9, filed Mar. 24, 1992.

BACKGROUND OF THE INVENTION

Water transfers its dynamic forces to the surrounding shoreline or to the bottom of a body of water whenever currents or wave movements occur. Particles within water beds and shorelines are carried away and deposited elsewhere, resulting in sedimentation and erosion.

Attempts to halt sedimentation and erosion have thus far utilized construction materials to form pilings, retaining walls and sheet pilings. These were the elements of choice for stabilizing shapes and positions of ocean, lake and river shorelines. However, such construction elements used alone were neither in harmony with nature nor long-lived.

In the more recent past some efforts were made to utilize seeds for stabilizing embankments along dams and shorelines. However, germination could only occur during certain seasons of the year and only under the most favorable conditions. Such seeds rarely germinated in sufficient numbers to provide reliable vegetative growth.

What is needed is an approach for stabilizing and protecting shorelines that would use ecologically compatible vegetative growth with structurally reinforcing construction materials in a variety of arrangements to accommodate different topographies.

SUMMARY OF THE INVENTION

The present invention relates to an arrangement for shoreline construction, maintenance, and protection, processes of preparation and methods of use of the same. In particular, the invention concerns plant plugs and fiber rolls as ecological-botanical elements implanted among construction materials, processes of arrangement and methods of use for preventing shoreline erosion.

In one embodiment, plant plugs consisting of at least two precultivated, emergent aquatic plants have their roots contained within a biodegradable, water-permeable vegetative carrier. Such plant plugs are placed within riprap on shores to maintain shoreline positions.

Another embodiment comprises plant plugs and fiber rolls appropriately placed on a shore to provide protection for the shore. Fiber rolls include decaying fibrous material with precultivated, emergent aquatic plants rooted within the fibrous material. Fiber rolls are placed at high or low water marks with plant plugs placed among riprap higher or shore to provide protection from erosion. Another embodiment utilizing fiber rolls in combination with sheet pilings includes a positioning ballast body connected to a supportive buoyancy body, in turn affixed to a fiber roll, thereby forming a floating device. Such a device is then flexibly attached to a sheet piling. These floatable devices can serve as docks particularly in areas of varying water levels.

Other embodiments include plant carpets and plant pallets. Plant carpets include precultivated emergent aquatic plants arranged and secured by ropes and stakes during an initial rooting period to form carpets. The carpets can be rolled and used to cover large areas of shoreline. Plant pallets comprise precultivated, emergent aquatic plants arranged within an outer wrapping or netting. Such pallets can thickly cover large shoreline areas where needed. Plant carpets and plant pallets may each be attached to one another to form large ecological-botanical elements secured to shorelines by construction materials.

Other arrangements of fiber rolls include dam formations in which pilings are inclined at such angles so as to form an open-ended trapezoid containing a fiber roll on top of layers of brush. On steep shorelines, successive pilings of fiber rolls are placed on a submerged bag of stones held in position by pilings. On shallow shores, a single fiber roll is secured by a surrounding net held in place by pilings.

Any number of arrangements is possible using ecological-botanical elements that include precultivated, emergent aquatic plants in combination with construction materials.

BRIEF DESCRIPTION OF THE DRAWINGS

FIG. 4 is an oblique perspective view of a preferred embodiment of fiber rolls;

FIG. 5 is a top plan view of two fiber rolls joined by lacing;

FIG. 6 is a cross-sectional view of an embodiment for dam construction;

FIG. 7 is a cross-sectional view of an embodiment for shoreline protection;

FIG. 8 is a cross-sectional view of an embodiment for steep shoreline slopes;

FIG. 9 is a cross-sectional view of an embodiment for gradual shoreline slopes;

FIG. 10 is a cross-sectional view of an embodiment for use with sheet piling construction materials;

FIG. 12 is a cross-sectional view of yet another embodiment of the subject invention;

FIG. 13 is a cross-sectional perspective view of the embodiment of FIG. 12;

FIG. 14 is another cross-sectional perspective view of the embodiment of FIG. 12;

FIG. 15 is a cross-sectional view of still another embodiment of the subject invention;

FIG. 16 is a cross-sectional view of the same embodiment of FIG. 15 in combination with other embodiments;

DESCRIPTION OF THE EMBODIMENT

Figure 1:
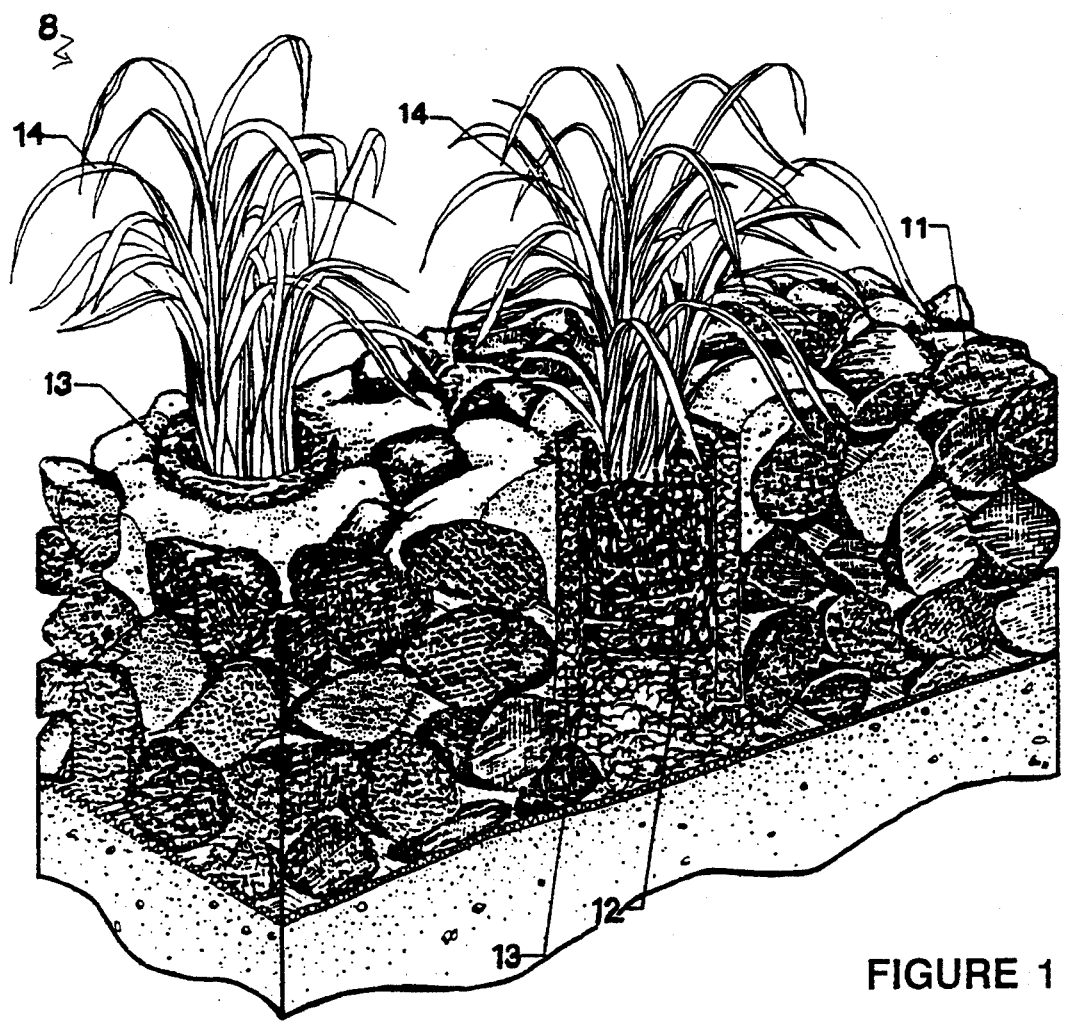
FIG. 1 is an oblique elevational perspective view of an embodiment of ecological-botanical elements of the subject invention.

Referring to the drawings in detail, an embodiment of an arrangement for shoreline construction, maintenance and protection is shown and is generally designated by the reference numeral 8. (See FIG. 1) The invention basically comprises a plant plug (12) including emergent aquatic plants (14) held within a vegetative carrier system (13). The plant plug (12) may contain from as few as two or as many plants as desired. The number of plants within a given plant plug (12) will vary with the species selected which, in turn, is determined by the shoreline area to be protected. Emergent aquatic plants (14) are precultivated to eliminate vagaries of seed propagation and germination and to allow desired placement.

A vegetative carrier system (13) made of a biodegradable, water-permeable substance is used to contain and protect the roots of the emergent aquatic plants (14) comprising the plant plug (12). The vegetative carrier system (13) provides ease of handling plant plugs (12) such as when placing plant plugs (12) into riprap (11) on a shoreline. (See FIG. 1.)

Figure 2:
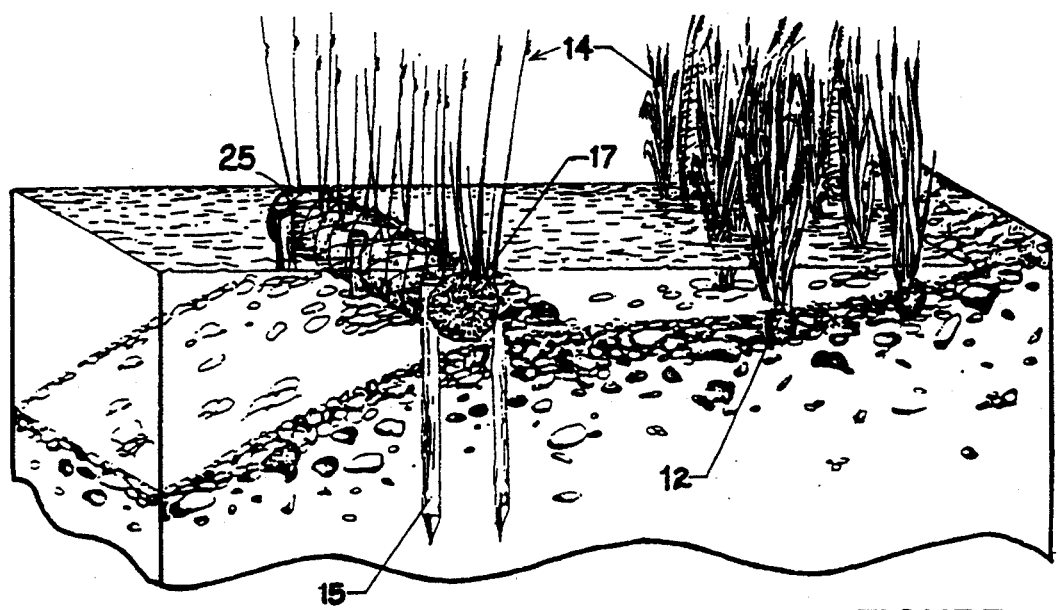
FIG. 2 is an oblique perspective view of another embodiment of ecological-botanical elements of the present invention.
Figure 3:
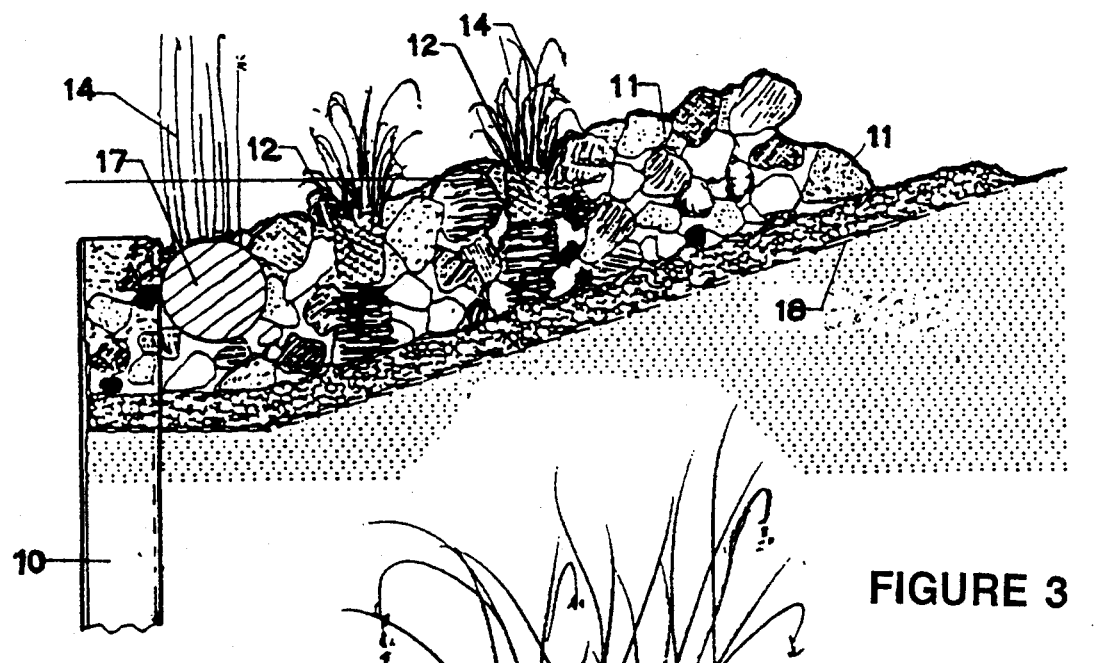
FIG. 3 is a cross-sectional view of an embodiment of FIG. 1.

As best shown in FIGS. 2 and 3, a second embodiment of the invention is the combined use of plant plugs (12) and fiber rolls (17) for shoreline maintenance and protection. Fiber rolls (17) comprise slowly decaying material such as coir held within a coarse mesh netting (25) into which are rooted precultivated emergent aquatic plants (14). Placement of fiber rolls (17) secured by pilings (15) close to an edge of a body of water and plant plugs (14) behind the fiber rolls provides shoreline protection especially at high or low water marks. (See FIGS. 2 and 3.) As shown in FIG. 3, a nonwoven filter (18) is used to underlay riprap (11) where plant plugs (12) and fiber rolls (17) containing precultivated emergent aquatic plants (14) are placed within the riprap (11). Such an arrangement is often used in conjunction with a wall or sheet piling (10).

Figure 3A:
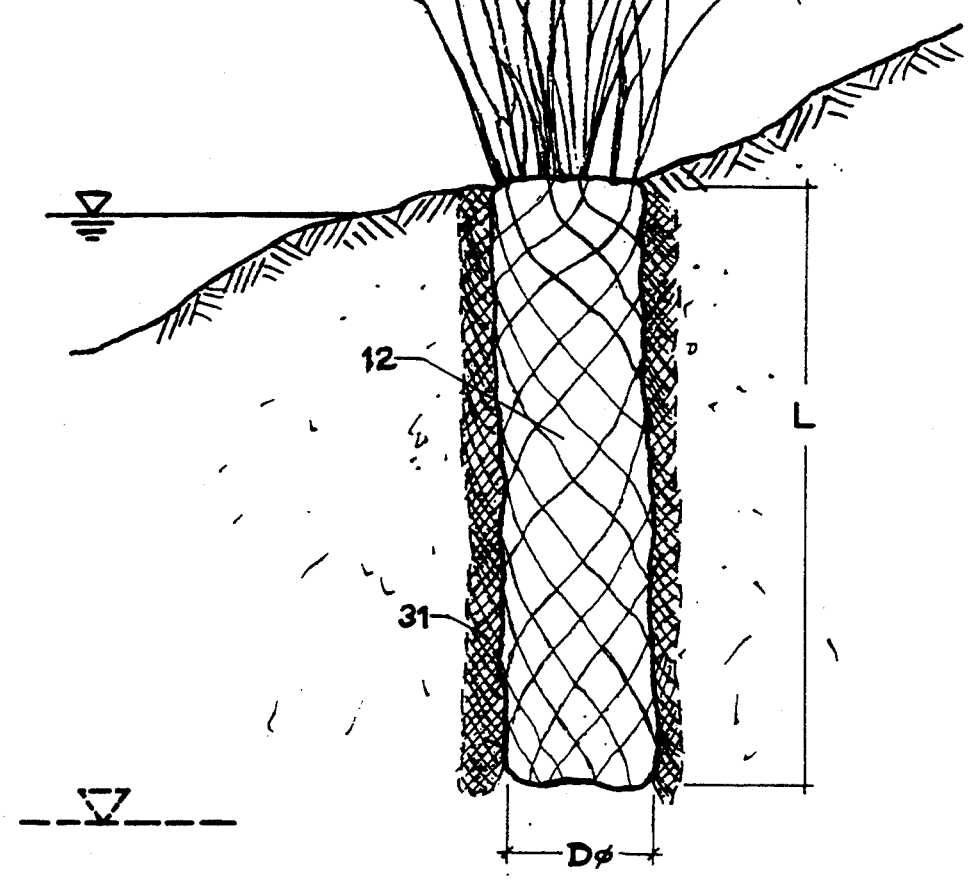
FIG. 3A is a cross-sectional view of an embodiment of a plant plug.

FIG. 3A shows an embodiment of the invention for shorelines that experience extremes of water level fluctuation. Here, where areas of shoreline may at times by too dry to support plant life, the use of plant plugs (12) having a bulb length, L, to bulb diameter, D, ratio of at least 1:1 and preferably 2:1 allows the precultivated emergent aquatic plants (14) to obtain water through capillary action at their roots. A substrate material (31) of choice may be used to surround the plant plug (12).

FIGS. 4 and 5 show arrangements for attaching fiber rolls (17) to one another. In FIG. 4, an outer netting (25) is used to hold two fiber rolls (17) adjacent to one another. The fiber rolls (17) are secured by means of pilings (15) driven into a shoreline. In FIG. 5, fiber rolls (17) are attached to one another by a netting material (25) laced between them.

FIGS. 6, 7, 8, and 9 show different possible arrangements for fiber rolls (17) to accommodate different shoreline contours. As shown in FIG. 6, a vegetative off-shore dam is created by pilings (15) driven into a shoreline. The pilings (15) are inclined at angles to one another so as to form an open-ended trapezoidal shape. The trapezoidal shape is then filled with brush layers (26) and a fiber roll (17) securely fixed to the top of the brush layers (26). Similarly, the shape of a shoreline can be maintained by placing a fiber roll (17) near the edge of the water and securing the fiber roll (17) in position by means of pilings (15). (See FIG. 7.) Sand and gravel may be layered over a non-woven filter (18) and placed behind the fiber roll (17) to further assure its position. Where steep slopes occur at shorelines, multiple layers of fiber rolls (17) each secured by stakes (19) and pilings (15), are placed on top of a submerged bag of stones, also held in position by pilings (15). (See FIG. 8.) In contract, where shorelines having gradual slopes and shallow waters occur, fiber rolls (17) secured by nets (20) and pilings (15) provide sufficient protection for maintenance.

Figure 11:
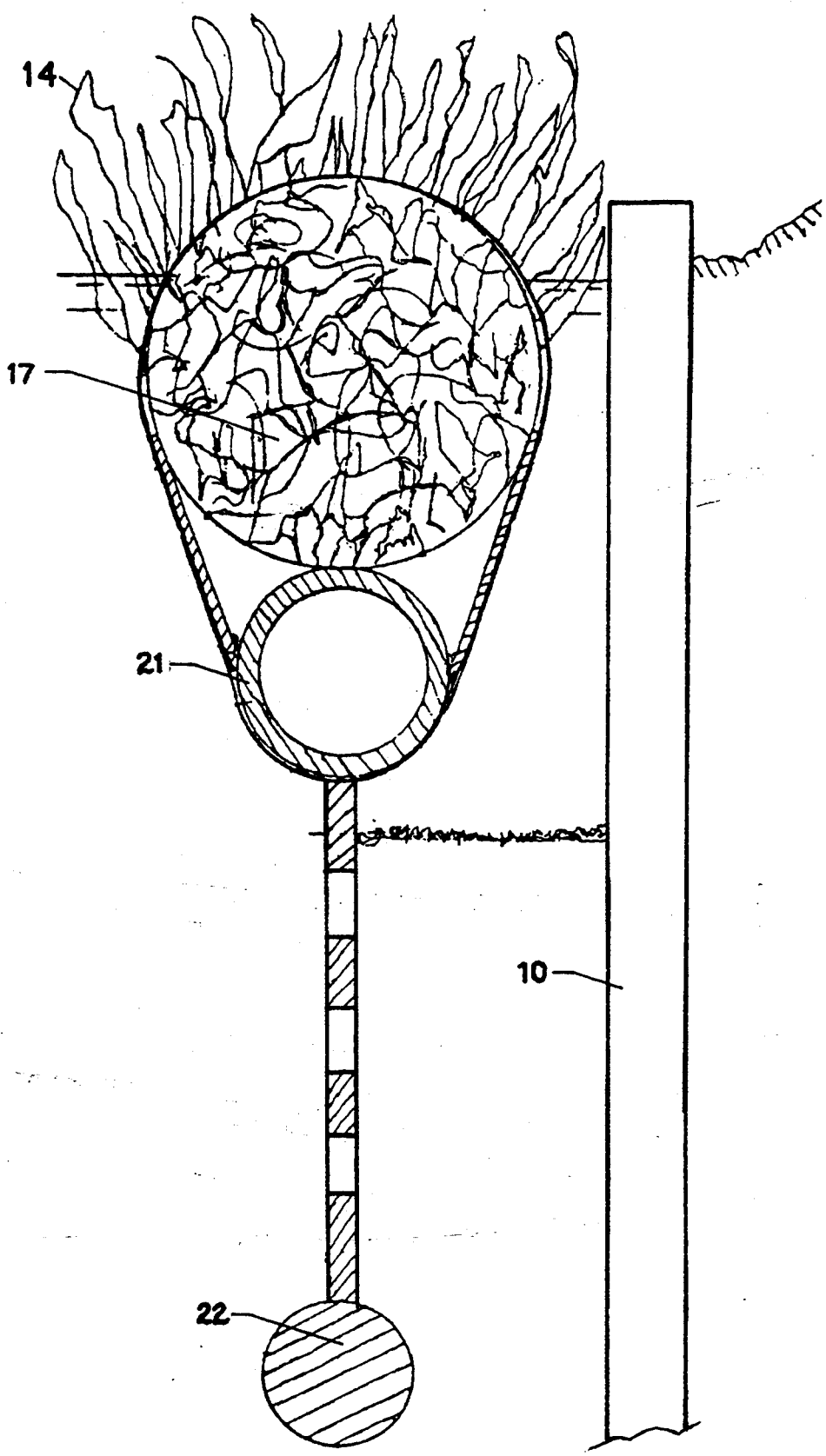
FIG. 11 is a cross-sectional view taken through a plane 11—11 of FIG. 10.

As seen in FIGS. 10 and 11, another embodiment comprises a sheet piling (10) retaining plant plugs (12), and fiber rolls (17) implanted among riprap (11) layered onto a non-woven filter (18) on a shoreline. Unique to this embodiment is a fiber roll (17) constructed as a floating element for adaptation to changes in water levels. A fiber roll (17) is affixed to a supportive buoyancy body (21) which, in turn, is attached to a ballast body (22). The fiber roll (17) floats as the surface of the water and the ballast body (22) stabilizes the position of the fiber roll (17). A flexible fastener provides attachment between the sheet piling (10) and the fiber roll (17), buoyancy body (21), and ballast body (22) in order to maintain a positional arrangement between the fiber roll (17) relative to the sheet piling (10).

FIG. 12 shows an embodiment of a plant riprap (23). The plant riprap (23) includes outer thick layers of biodegradable non-woven felt (27) on three of its four sides and an inner substrate (29) containing precultivated, emergent aquatic plants (14). A humus-free gravel substrate is the substrate of choice through other substrates may be used. A non-woven geotextile (28) is placed over the substrate to prevent washing away of the substrate (29) and the precultivated, emergent aquatic plants (14) from the plant riprap (23). A nylon non-woven geotextile (28) is preferable although any geotextile would be acceptable for use in this arrangement. The total plant riprap (23) is surrounded by netting (25) to retain a desired shape. As seen in FIG. 12, a number of plant riprap (23) may be connected to provide larger areas of coverage.

FIGS. 13, 14, and 15 show still other embodiments of plant ripraps (23). A plant riprap (23) may be secured to a sloping shoreline by stakes (19) as shown in FIGS. 13 and 14, and may also be used to form a submersed dam held in place by stakes (19) as shown in FIG. 15.

Figure 18:
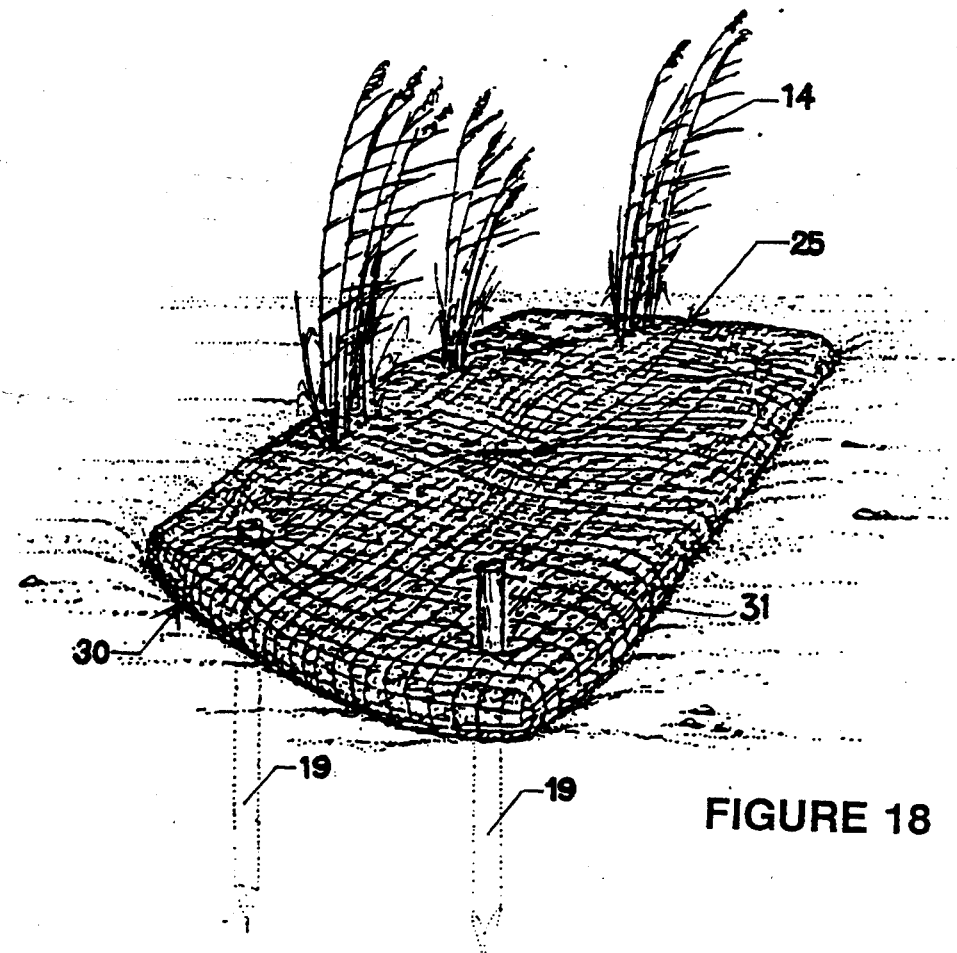
FIG. 18 is an oblique elevational view of the same embodiment of FIG. 17.

FIG. 16 best shows a use of a combined variety of ecological-botanical vegetative carrier systems with construction materials to prevent erosion of a shoreline having multiple topographical features. A layer of stone secured by netting (25) overlies an underwater brush layer (26). A non-woven filter (18) is placed on a sloping portion of the shoreline adjacent to the brush layer (26), and a layer of rock rolls (24) secured by pilings (15) is layered over the non-woven filter (18). Adjacent to the rock rolls (24) and non-woven filter (18) is placed a plant riprap (23) which is secured to the shore by pilings (15). Higher on the shoreline are placed plant pallets (30) also held in place by pilings (15), and plant plugs (12). Plant plugs (12), plant pallets (30), and plant ripraps (23) all contain precultivated, emergent aquatic plants (14). As best shown in FIG. 18, a plant pallet (30) comprises precultivated emergent aquatic plants (14) within a substrate (31) surrounded by an outer wrapping of netting (25). Plant pallets (30) preferably range in width from 0.8 to 1.25 meters and have thicknesses of 4 centimeters or more. Various dimensions can be made to accommodate different shoreline topographies. Plant pallets (30) are usually held in position on a shoreline by stakes (19).

Figure 17:
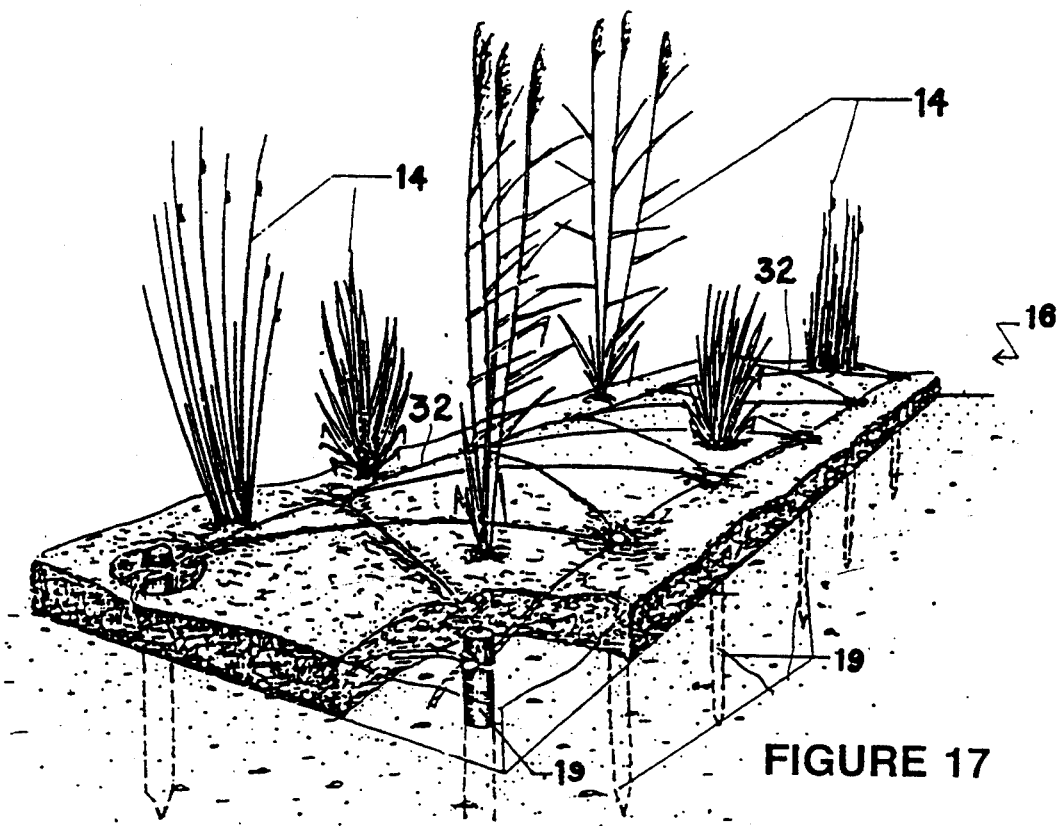
FIG. 17 is an elevational perspective view of still another embodiment of the present invention.

FIG. 17 shows a plant carpet (16) as yet another embodiment. Plant carpets (16) are formed of precultivated, emergent aquatic plants (14) secured during their initial rooting period by ropes (32). With growth, the roots of the precultivated, emergent aquatic plants (14) merge with one another to form plant crops (16). Preferred widths for plant carpets (16) range from 0.5 to 2.0 meters for ease of rolling and handling. However, any dimensions desired can be achieved by appropriate arrangement of precultivated, emergent aquatic plants (14) at the initial period of growth.

What is claimed is:

1. A plant riprap material adapted for use in the protection of a shoreline which riprap material comprises:
   a) a biodegradable felt material having bottom and upright sides to define an interior space with an open top;
   b) a substrate gravel material in the space and on the bottom of the felt material adapted to receive and form a rooting material for emergent aquatic plants;
   c) a geotextile material over the open top to retain the substrate material; and
   d) a netting material surrounding the felt material and the geotextile material to retain the desired shape of the plant riprap material.

2. The plant riprap material of claim 1 which includes a plurality of precultivated emergent aquatic plants rooted in the substrate material and the plants extending upwardly from the open top of the interior space.

3. The plant riprap material of claim 1 wherein the substrate material comprises a humus-free gravel material.

4. The plant riprap material of claim 1 wherein the felt material comprises a non-woven material.

5. The plant riprap material of claim 1 wherein the substrate material comprises a coir material.

6. The plant riprap material of claim 1 wherein the aquatic plants have a bulb length L to bulb diameter D ratio of at least 1:1.

7. The plant riprap material of claim 1 wherein the geotextile material comprises a nylon non-woven material.

8. The plant riprap material of claim 1 which has a generally rectangular shape and a shallow depth.

9. A shoreline which contains on the shoreline to prevent erosion at least one plant riprap material of claim 1 secured to the shoreline.

10. The shoreline of claim 8 which contains a plurality of plant riprap materials on the shoreline.

11. The shoreline of claim 8 wherein the plant riprap material is secured to the shoreline by a plurality of stakes driven through the plant riprap material and into the shoreline.

12. The shoreline of claim 8 which includes on the shoreline a fiber roll means arranged generally longitudinally and positioned parallel to the shoreline, which fiber roll means comprises coir material having an exterior netting material to maintain the coir material in roll form.

13. A plant riprap material adapted for use in the protection of a shoreline which riprap material comprises:
   a) a biodegradable, non-woven, felt material having bottom and upright sides to define an interior space with an open top;
   b) a gravel substrate material in the space and on the bottom of the felt material;
   c) a plurality of precultivated emergent aquatic plants rooted in the substrate material and the plants extending upwardly from the open top of the interior space;
   d) a non-woven geotextile material over the open top to prevent the washing away of the substrate material; and
   e) a netting material surrounding the felt material and the geotextile material to retain the desired shape of the plant riprap material.

* * * * *

UNITED STATES PATENT AND TRADEMARK OFFICE
CERTIFICATE OF CORRECTION

PATENT NO. : 5,425,597
DATED : June 20, 1995
INVENTOR(S) : Lothar Bestmann

It is certified that error appears in the above-indentified patent and that said Letters Patent is hereby corrected as shown below:

On the title page, items

[54] TITLE
PLANT RIPRAP MATERIAL FOR SHORELINE PROTECTION

[56] REFERENCES CITED
5,309,673   5/1994   Stover.................

Signed and Sealed this

Seventeenth Day of October, 1995

Attest:

BRUCE LEHMAN

Attesting Officer    Commissioner of Patents and Trademarks